United States Patent [19]
Robinson et al.

[11] Patent Number: 6,109,120
[45] Date of Patent: Aug. 29, 2000

[54] UNIVERSAL ACTIVE SHAFT SENSOR MOUNTING ASSEMBLY

[75] Inventors: Christopher Robinson, Groveland, Ill.; Adrian Peter Morris, Little Haywood, United Kingdom

[73] Assignees: 4B Elevator Components; Synatel Instrumentation Ltd., both of United Kingdom

[21] Appl. No.: 09/293,422

[22] Filed: Apr. 16, 1999

[51] Int. Cl.[7] .................................................. G01D 21/00
[52] U.S. Cl. ............................................................ 73/866.5
[58] Field of Search ................................. 73/493, 866.5; 324/207.25, 166–168, 173, 174, 176, 178, 179

[56] References Cited

U.S. PATENT DOCUMENTS

| | | | |
|---|---|---|---|
| 4,502,853 | 3/1985 | Ohi | 324/167 |
| 4,769,600 | 9/1988 | Ito | 324/207.25 |
| 5,611,545 | 3/1997 | Nicto | 324/207.25 |
| 5,756,894 | 5/1998 | Paolo et al. | 324/174 |
| 5,762,425 | 6/1998 | Ouchi | 324/207.25 |
| 5,803,419 | 9/1998 | Nicot | 324/173 |

FOREIGN PATENT DOCUMENTS

| | | | |
|---|---|---|---|
| 256377 | 2/1982 | France | 324/174 |
| 0034453 | 2/1982 | Japan | 324/174 |

*Primary Examiner*—Robert Raevis
*Attorney, Agent, or Firm*—Kajane McManus

[57] ABSTRACT

The universal active shaft sensor mounting assembly comprises a base including structure thereon for fixedly engaging a rotational shaft sensor onto an end of a rotatable shaft in a manner maintaining the sensor fixed in position against rotation. The assembly is fixed to the end of the shaft by a spindle rotatably engaged to the base with the axis of rotation for the spindle and shaft being the same. A target element fixedly engages another end of the rotatable spindle, rotating therewith and interacting with the sensor mounted to the base.

19 Claims, 2 Drawing Sheets

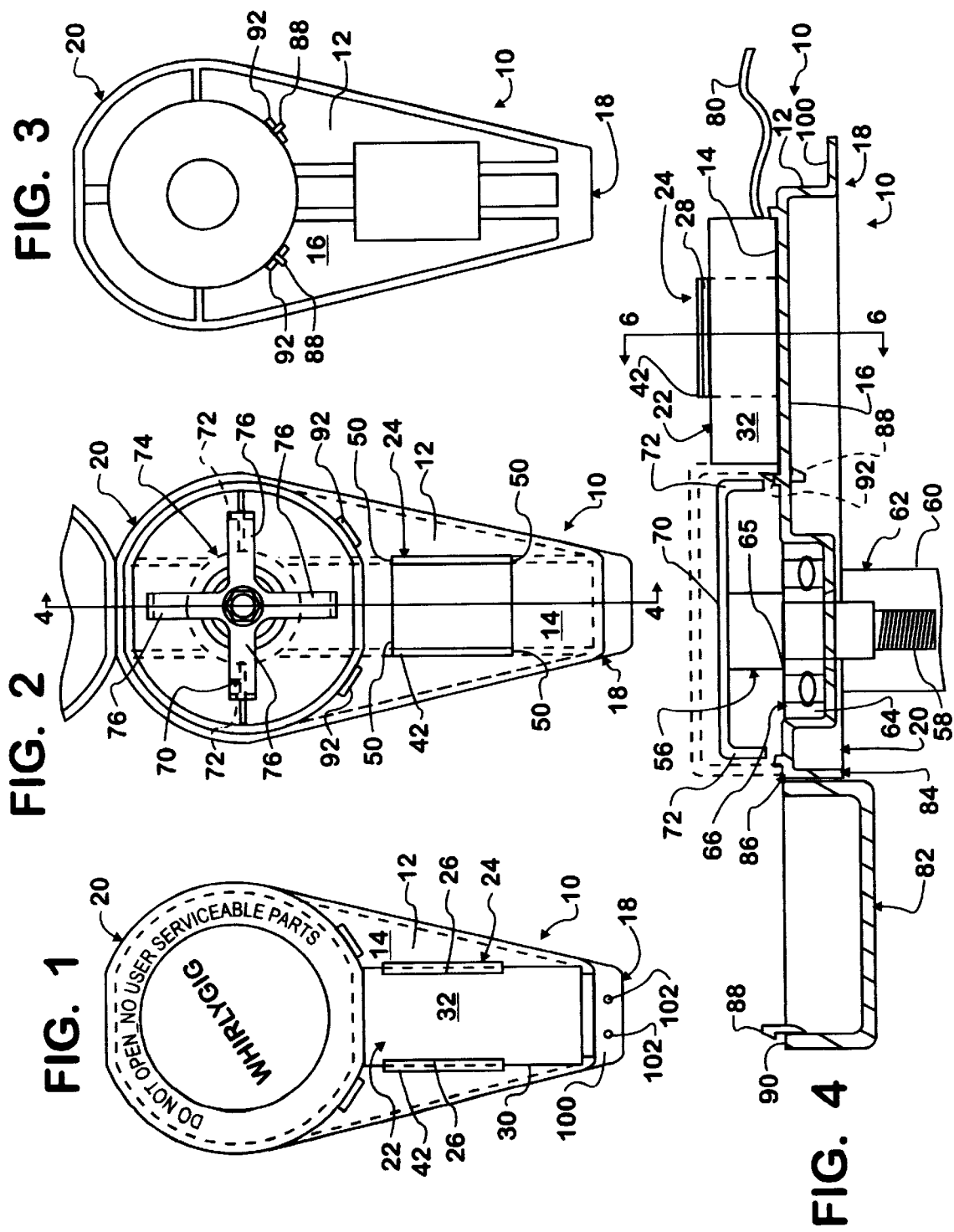

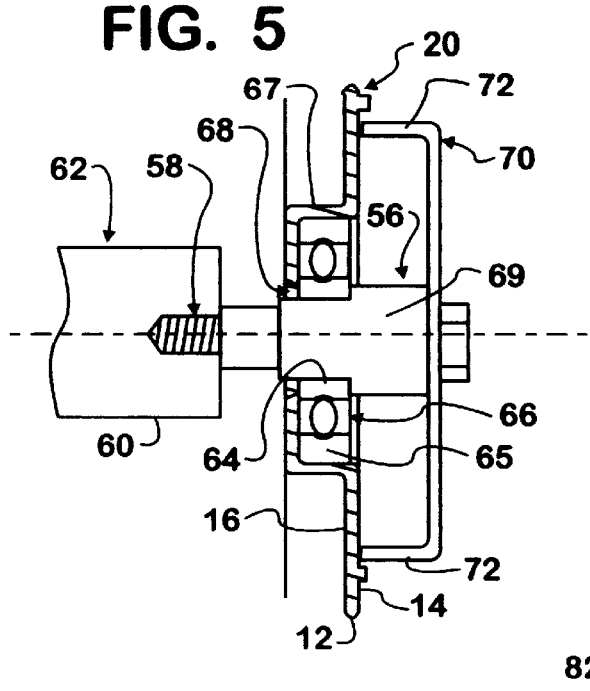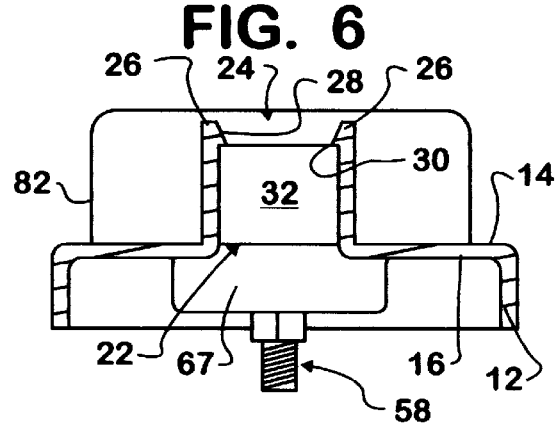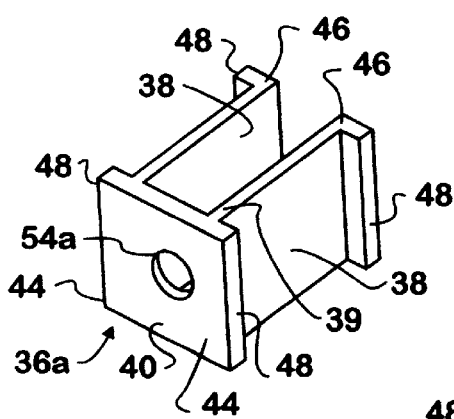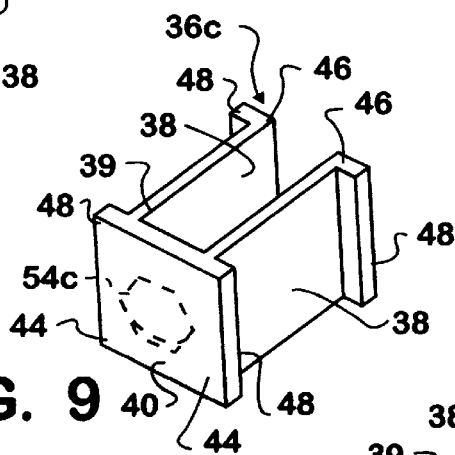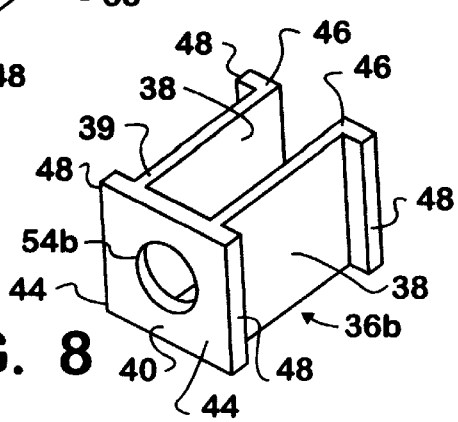

UNIVERSAL ACTIVE SHAFT SENSOR MOUNTING ASSEMBLY

BACKGROUND OF THE INVENTION

The present invention relates to a mounting assembly for a sensor which monitors speed, direction, through-put, capacity, acceleration, deceleration, etc., of a rotating shaft. More particularly, the assembly allows for direct mounting of the sensor to a shaft being monitored while simultaneously providing an active target for the sensor.

PRIOR ART

Heretofore, sensors used for monitoring action of a rotating shaft have typically required mounting of the sensor to a rigid fixture of a machine incorporating the shaft and have required engagement of a target for the sensor upon the rotating shaft at a circumferential position therearound.

Such mounting has required the sensor to be repositioned when shaft parameters such as wear, tensioning, adjustment, etc., change, in order to assure reliable readings from the sensor.

Alternatively, an expensive and complex device typically referred to as an encoder has been available for use in place of the sensor/target combination.

Such encoder includes a sensor and target made by a particular manufacturer which are encased together in a housing of the manufacturer and adapted to directly engage upon the rotating shaft.

Use of the encoder leaves the sensor/target combination it replaces of no further use, further adding to the true "costs" of the encoder, which ultimately increase costs down the line to the consumer.

Accordingly, there exists a need for an assembly which will allow for use of a sensor of substantially any manufacturer as a shaft mounted sensor which cooperates with an active target of the assembly, eliminating the need to continuously reposition and verify accuracy of the sensor or to replace the sensor with an encoder while reproducing the accuracy and reliability of the encoder at a significantly lesser cost.

SUMMARY OF THE INVENTION

This object as well as others is met by the mounting assembly of the present invention which comprises a base mounted to an end of a rotating shaft by means of a first end of a spindle which is rotatably engaged to the base and which is coaxial with the axis of rotation of the shaft, the spindle mounting a replaceable embodiment of a target structure on an opposite end thereof, the spindle being driven by the shaft and the base being fixed in position relative thereto and incorporating structure thereon for engaging any of a plurality of sensors thereto in a manner where the sensor functionally cooperates with the active target for generating desired parameter readings.

BRIEF DESCRIPTION OF THE DRAWINGS

FIG. 1 is a perspective view of a sensor engaging face of the mounting assembly with a cover of the assembly seated thereover.

FIG. 2 is similar to FIG. 1 but shows the cover in an open position, illustrating one embodiment of an active target mounted on a rotatable, shaft driven spindle of the assembly.

FIG. 3 is a perspective view of the shaft engaging face of the assembly.

FIG. 4 is a longitudinal cross sectional view through the assembly taken along line 4—4 of FIG. 2.

FIG. 5 is a cross sectional view through the spindle area of the assembly showing one end of the spindle threadedly engaged to an end of a rotatable shaft, the spindle being driven by the shaft and being coaxial therewith.

FIG. 6 is an end view of the assembly taken along line 6—6 of FIG. 4.

FIG. 7 is a perspective view of a first adapter of the assembly.

FIG. 8 is a perspective view of a second adapter.

FIG. 9 is a perspective view of a third adapter.

DESCRIPTION OF THE PREFERRED EMBODIMENTS

Referring now to the drawings in greater detail, there is illustrated therein the universal active shaft sensor mounting assembly of the present invention generally identified by the reference numeral 10.

The assembly 10 includes a substantially planar base 12 having a first face 14 which may be defined as the sensor bearing face 14 and a second face 16 which may be defined as the shaft side face 16.

Further, the base 12 has a sensor engaging end 18 and a shaft engaging end 20, as clarified below.

The assembly 10 is universal with regard to accommodating substantially any sensor 22 presently manufactured although, in its most basic form, it is designed to accommodate a sensor 22 sold under the mark "M800" by 4B Elevator Components Limited of East Peoria, Ill.

In this respect, it will be seen that the face 14 includes an upstanding dual prong clamp 24 thereon, the prongs 26 of which are spaced apart a predetermined distance and rise a predetermined distance from the face 14, with each prong 26 terminating in a laterally inwardly directed flange 28 which engages over a lateral edge 30 of a substantially rectangular housing 32 of the illustrated sensor 22, securing the sensor housing 32 to the base 12 in a snap fit manner.

All sensors 22, however, do not have identical housings. There is one group of standardized sensors 22 having a cylindrical housing of a diameter of 14 mm. Further, there is another group of sensors 22 having a larger cylindrical housing of a diameter of 30 mm. Finally, there is a group of sensors 22 each of which includes a uniquely configured housing. All of these sensor 22 embodiments are well established in the art.

In order to be considered a universal mounting assembly 10, substantially all embodiments of sensor 22 must be accommodated for engagement to the base 12. This is accomplished by the provision of a plurality of adapters 36a, 36b, and 36c for the assembly 10, as shown in FIGS. 7–9.

Each adapter 36 includes a pair of spaced apart parallel legs 38 which are joined together at one end 39 by a planar bridge 40.

The legs 38 are configured to be engaged by the prongs 26 of the clamp 24 in a fixed position relative thereto, with the bridge 40 spanning the distance between the prongs 26 at a first, inner end 42 of the clamp 24, and with the length of each leg 38 being approximately equal to the length of each prong 26.

To keep the adapters 36 from moving longitudinally, each lateral edge 44 of the bridge 40, and a free end 46 of each leg 38 includes a lateral flange 48 which extends laterally outwardly thereof in a manner to engage against a cooperating end edge 50 of each prong 26 of the clamp 24, essentially fixing the sensor 22 engaged thereby in place against motion toward, and most particularly against motion away from, the shaft engaging end 20.

The adapters 36a, 36b and 36c differ only in the configuration of the bridge 40 thereof. In this respect, it will be seen that adapter 36a includes a port 54a therein which is sized to frictionally engage a cylindrical sensor 22 of the first group while adapter 36b includes a port 54b therein sized to frictionally engage a sensor 22 of the second group, as defined above.

Adapter 36c is provided to accommodate a sensor 22 of the third group having a housing 32 with a unique configuration (not shown). In this respect, the bridge 40 is provided as a solid, planar member which can be cut or punched through to provide a port 54c (shown in phantom) therein which will mimic the cross sectional configuration of the housing 32 of the sensor 22 to frictionally engage same.

Thus the adapters 36a, 36b and 36c, used in conjunction with the base 12, provide a universal mount for substantially any sensor 22 available on the market.

Further, it has been stated that the mounting assembly 10 is active.

In this respect, it will be understood that the shaft engaging end 20 of the base 12 incorporates a rotatable spindle 56 having a first threaded end 58 which is threadedly engaged to an end 60 of a rotating shaft 62 in a manner so that the axis of rotation for the spindle 56 and the axis of rotation for the shaft 62 are identical. Thus, the shaft 62 and spindle 56 rotate together.

To allow for rotatability of the spindle 56 relative to the base 12 of the assembly 10 the spindle 56 is engaged to the base 12 via an inner race 64 of a ring bearing 66, while the base is engaged to an outer race 65 of the bearing 66. In the illustrated embodiment the bearing 66 is shown positioned within a pocket 67 provided for same in the base 12, with the spindle 56 extending through a bore 68 centered within the pocket 67, allowing for such relative rotational motion therebetween, in known manner.

A second end 69 of the spindle 56, which rises a predetermined distance above the sensor bearing face 14 of the base 12, is adapted to fixedly engage thereon any of a plurality of various embodiments of a target element 70. Each target element 70 shown in the Figures is provided for the purpose of illustration only and should not be construed as limiting.

In this respect, varying degrees of accuracy are necessary for use in various machines incorporating the rotating shaft 62. For example, in the embodiment illustrated in FIG. 2, the target element 70 includes a target 72 positioned to indicate each 90° of shaft 62 rotation while the target element 70 illustrated in FIGS. 4 and 5 provides a target 72 indicative of each 180° of shaft 62 rotation.

Studying the target element 70 in greater detail, it will be understood that a planar body 74 is provided which includes a radial array of arms 76, with the body 74 of the target element 70 being fixed to the end 69 of tile spindle 56, at a point defining the axis of rotation of the spindle 56. The body 74 is elevated by the spindle 56 to a position above that at which the sensor 22 is engaged, although it could also be located at any other position noncoplanar with the sensor 22. Each arm 76 terminates, in this embodiment, in a target 72 defined by a depending finger 72 which extends across the sensing path of the sensor 22, and can therefore be sensed at each crossing of the path the sensor 22 is monitoring. Thus, as the target element 70 is driven by the spindle 56, which in turn is driven by the rotating shaft 62, precision of readings may be increased or decreased by respectively increasing or decreasing the number of fingers (targets) 72 present.

It will be understood that the base 12 must necessarily remain stationary so that relative motion between the sensor 22 and the target 72 is possible. To fix the position of the base 12 against rotation, it must first be understood that the sensor 22 is typically connected to an appropriate processor (not shown) by means of a cable 80 for use in transference of signals therebetween. By fixing the cable 80 to an immobile object such as a machine surface or the processor itself (not shown), due to the light weight proposed for the base 12, such fixation of the sensor cable 80 will maintain the base 12 stationary against any rotational urge.

Finally, inasmuch as access would only be needed to the target engaging end 69 of the spindle 56 on a limited basis i.e., for changing target elements 70, if necessary, etc., to maintain the spindle 56, target element 70 and ring bearing 66 substantially free of any environmental debris, it is proposed to provide a snap lock cover 82 which pivots over the shaft end 20 of the base 12 from an end edge 84 thereof, the cover 82 being engaged to the end edge 84 by means of a living hinge 86, with spring tabs 88 along a free end 90 of the cover 82 engaging within cooperating slots 92 formed in the base 12.

Finally, it will be seen that the sensor end 18 of the base 12 includes a dropped tail 100. If desired, this tail 100 may be provided with structure for use in securing the base 12 to an immobile object if it is desired not to use the cable 80 for this purpose.

In a preferred embodiment, the dropped tail 100 may incorporate tabs 102 thereon which may be engaged by ends of a belt (not shown) or other suitable structure with length of the belt being looped about the immobile object.

As described above, the assembly 10 provides a number of advantages, some of which have been described above, and others of which are inherent in the invention.

Also, modifications may be proposed to the assembly 10 without departing from the teachings herein. Accordingly the scope of the invention is only to be limited as necessitated by the accompanying claims.

What is claimed is:

1. A universal active shaft sensor mounting assembly for mounting a rotational sensor directly onto a rotatable shaft, the assembly comprising a substantially planar base; a clamp at a first end of the base for engaging a sensor thereto; a spindle rotatably mounted at a second end of the base, and extending through the base; the spindle having a first end engaged to an end of the rotatable shaft and being rotated thereby and having a second end to which a target element is mounted, the target element being fixedly engaged to the spindle and positioned thereby to allow a target thereof to intermittently cross a sensing path of the sensor as the target element rotates with the shaft driven spindle, in combination with a plurality of adapters each of which engages a differently configured sensor.

2. The assembly of claim 1 wherein each adapter is sized and configured to immovably engage said clamp.

3. The assembly of claim 2 wherein the spindle is coaxial with the rotatable shaft.

4. The assembly of claim 2 wherein the target element is removably engaged to a second end of the spindle.

5. The assembly of claim 4 wherein the target element comprises a planar body including a plurality of radial arms.

6. The assembly of claim 5 wherein each radial arm terminates in a depending finger.

7. The assembly of claim 6 wherein each depending finger defines the target.

8. The assembly of claim 7 wherein the spindle positions the target element relative to a sensor to allow each target to intermittently cross a sensing path of the sensor as the target element is rotated by the shaft driven spindle.

9. The assembly of claim 2 wherein each adapter comprises a pair of spaced apart legs joined together at one end by a planar bridge.

10. The assembly of claim 9 wherein the bridge includes a centered port therein.

11. The assembly of claim 10 wherein the port is sized to frictionally engage a corresponding sensor housing.

12. The assembly of claim 9 wherein the bridge is solid.

13. The assembly of claim 9 wherein the bridge includes a laterally extending flange at each lateral end thereof.

14. The assembly of claim 13 wherein each leg of the adapter has a free end which terminates in a laterally extending flange.

15. The assembly of claim 14 wherein the clamp comprises a pair of spaced apart upstanding prongs.

16. The assembly of claim 15 wherein each prong has a laterally inwardly directed flange at an upper end thereof.

17. The assembly of claim 15 wherein each leg of the adapter lies along a respective prong, the adapter engaging under the flanges of the prongs and the prongs engaging between the laterally extending flanges of the adapter.

18. The assembly of claim 1 wherein a ring bearing is interposed between said spindle and said base.

19. The assembly of claim 18 wherein said ring bearing seats within a pocket provided in the base and surrounds a bore centered in the pocket through which the spindle extends.

* * * * *